INVENTOR.
HAROLD LYONS

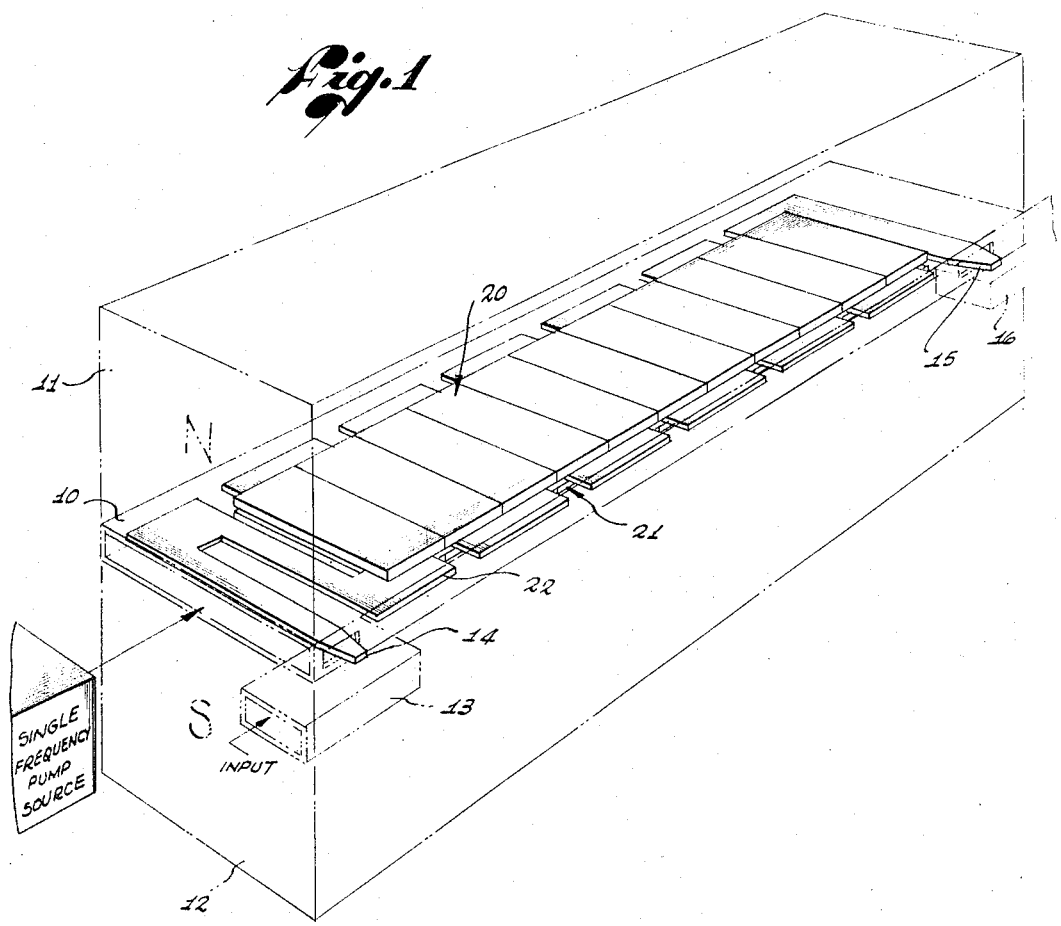
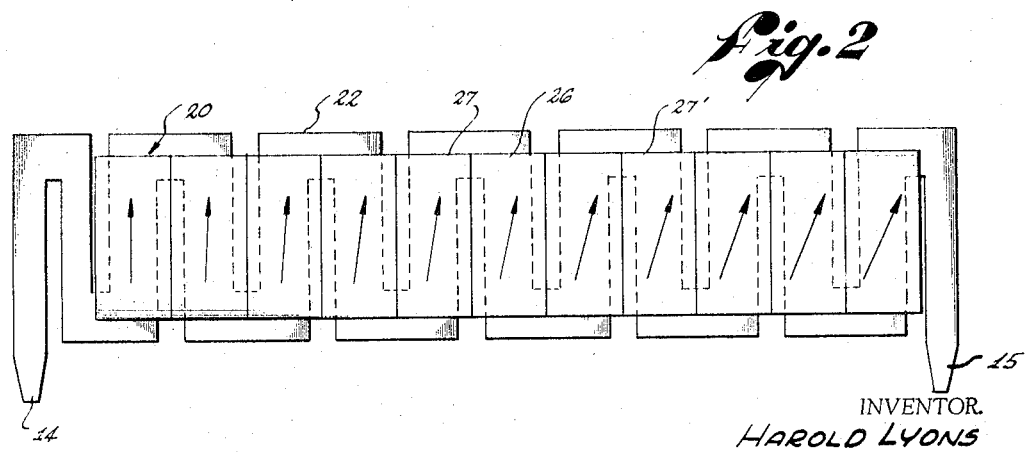
INVENTOR.
HAROLD LYONS

United States Patent Office 3,296,541
Patented Jan. 3, 1967

3,296,541
BROADBAND TRAVELING-WAVE MASER WITH BOTH MASER AND ISOLATOR CRYSTALS CUT AT DIFFERENT ANGLES TO THE OPTIC AXIS THEREOF
Harold Lyons, Pacific Palisades, Calif., assignor to Electro-Optical Systems, Inc., Pasadena, Calif.
Filed May 18, 1964, Ser. No. 369,657
2 Claims. (Cl. 330—4)

The present invention relates to amplifiers in general and more particularly relates to an improved broadband maser type of amplifier.

This application is a continuation-in-part of the original application filed March 20, 1962, having Serial No. 181,099, and now abandoned.

Relatively recent developments in atomic physics have produced an entirely new type of high-frequency amplifier that holds promise of providing great gains in the range and performance of radar, electronic counter measures, scatter communication systems, etc. This new amplifier has been given the name of "maser," the term "maser" being an acronym derived from the principle of operation, i.e., *m*icrowave *a*mplification by *s*timulated *e*mission of *r*adiation. Stated differently, a maser uses the principle of storing energy in stationary energy levels of atomic systems and then releasing it as useful radiant output, either in an oscillator or amplifier, by stimulating the system with the proper microwave signal More specifically, the operation of a maser is based upon the spin of electrons about their own axes, which spin, being equivalent to a moving charge, produces a magnetic field that is similar to the magnetic field produced by a dipole magnet. Because it is a spinning particle, the electron also behaves in a gyroscopic manner which, with the dipole magnet effect, produces a result similar to that obtained by mounting a dipole magnet with its polar axis aligned with that of the rotating element of a gyroscope. For this reason, the spinning electrons are oftentimes referred to as gyromagnets.

The maser material is mounted in a relatively strong D.-C. magnetic field which causes these so-called gyromagnets eventually to line up with the field so that the south poles of the gyromagnets are closest to the north pole of the magnet producing the magnetic field. With the gyromagnets in these positions, the maser material is said to be in thermal equilibrium, for the gyromagnets then have their lowest state of energy and tend, therefore, to remain in these positions until energy is fed or "pumped" into them. In other words, for short periods of time, these gyromagnets can be energized to be opposed to the magnetic field so that the north poles of the gyromagnets are adjacent to the north pole of the magnet. When so arranged, the gyromagnets are in a higher energy state for then they will release energy during "thermalization," the term "thermalization" being applied herein to the movement of the gyromagnets from a position of high energy to that of thermal equilibrium.

In so moving, the gyromagnets precess much like a gyroscope precesses with the exception that the frequency of precession, which is called the resonant frequency, is a function of the applied D.-C. magnetic field rather than of the force of gravity. The release of energy during movement is mostly in the form of heat unless the maser material is subjected to a microwave magnetic field directed at right angles to the D.-C. magnetic field. In this case, if the frequency of the microwave signal source is substantially equal to the resonant frequency of the gyromagnets, these gyromagnets will release their stored energy to the microwave field during their movements from their high-energy positions to their low-energy positions. Since the energy released in allowed transitions is quantized, the individual gyromagnets, in making a transition between one level and a lower one, yield their total stored energy. This phenomenon of releasing the stored energy by subjecting the maser material to electromagnetic radiation in the form of a microwave signal equal in frequency to an allowed transition from the level involved to a lower one is what is known as stimulated emission The energy so released produces an amplified version of the stimulating signal.

Microwave cavity masers based on the principles heretofore mentioned are operable at several thousands of megacycles (kmc.) and have a bandwidth in the order of about 50 megacycles. However, while the bandwidths of 50 megacycles or so are satisfactory for some applications, they are much too narrow for other uses. For a radiometer, for example, it can be shown that a bandwidth of from 1000 megacycles to 3000 megacycles is required in order to realize important improvements in temperature resolution, i.e., in achieving a minimum detectable change in temperature. A significant limitation, therefore, of the cavity maser has been the fact that, for a given crystal, it has been possible to increase its bandwidth only a few megacycles, either by changing the pump frequency or the strength of the external magnetic field, or both. Stated differently, a few megacycles per second is about the best one can do at present in extending or increasing the bandwidth of cavity type masers.

The problem of securing wide bandwidth, as well as relatively large gain and low noise can be solved in a number of ways. One method, for example, is to cascade a number of individual cavity masers, an obviously cumbersome technique and, therefore, to be avoided if at all possible. A second scheme, which has proven to be more promising and feasible, involves a long interaction path between the signal and crystal. Since such devices utilize a slow-wave structure similar to those used in traveling-wave tubes, they have come to be known as traveling-wave masers. In accordance with this second scheme, a traveling-wave maser has been developed by Bell Telephone Laboratories, Inc., of New York, N.Y., in which stagger-tuning for the purpose of varying the resonance frequency of the crystal material is the means by which broadband operation is provided. And, in order to stagger-tune, the magnetic field in this prior art device is made spatially non-uniform, that is to say, while it is held constant time-wise, it is made to vary along the length of the device. However, the orientation of the crystal, that is to say, the angle between the magnetic field and the crystal axis, is made uniform or constant throughout the device.

The trouble with a non-uniform magnetic field is that it also necessitates the use of complicated magnetic structures to achieve such a field. Furthermore, as will be recognized by those skilled in the maser field, if the bandwidth required from this earlier stagger-tuned device becomes reasonably large, such as at least several hundred megacycles, then additional pumping oscillators are needed with additional inputs to the crystal segments they are respectively pumping. However, this complicates the apparatus greatly and, because of the additional units required, including power supplies, etc., it adds greatly to the weight and expense of such apparatus. Moreover, the operation of such apparatus is a lot more difficult and, therefore, a great deal more critical, in attempting to get a uniform broad amplifier passband. In addition, if, as mentioned above, broadbanding methods are used which require different pumping frequencies for different crystal segments, then the further difficulty and complication is introduced of propagating all the different pumping frequencies down the same structure in the same manner as the signal frequency. That this would be a problem is indicated, for example, in U.S. Patent 3,004,225, entitled "Traveling Wave Solid State Masers"

by R. W. DeGrasse et al., issued October 10, 1961, and assigned to Bell Telephone Laboratories, Inc., wherein, in column 5, it states that the slow-wave structure of the maser device taught therein exhibits a passband characteristic the upper cut-off frequency of which occurs at the frequency for which the slow-wave structural elements are about a quarter wave length long.

The disadvantages, limitations and defects encountered in the prior art, some of which have been touched on above, are overcome by the present invention and this is achieved, bascially speaking, by providing a spatially uniform magnetic field and by cutting each piece of the several crystal segments used at successively different angles relative to the crystallographic axis. By so doing, the crystal segments are thus stagger-tuned since, when they are mounted in the amplifier, each piece has a slightly different orientation between its crystallographic axis and the magnetic field and, therefore, a different resonance frequency. Hence, the essence of the present invention is that broadbanding of a maser amplifier is made possible by varying the angle between the crystal axis and the D.-C. magnetic field for the several crystal segments utilized. As a result of this invention, bandwidths up to 2000 mc. can be obtained, if not more, and without the need for additional pumping oscillators and all the rest that goes with them.

It is, therefore, an object of the present invention to provide an improved stagger-tuned maser amplifier that has a bandwidth many times greater than that of any known prior art maser amplifier.

It is another object of the present invention to provide a stagger-tuned maser amplifier in which the stagger-tuning is obtained by staggering the angle of the several crystal segments used in the amplifier.

It is a further object of the present invention to provide a stagger-tuned broadband maser amplifier that is relatively simple in construction.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURE 1 is a perspective view of one form of broadband maser amplifier of my invention, showing rows of crystals along a meander line in a waveguide for amplifying forward waves and absorbing reflected waves, and showing the single frequency pump source and means providing a uniform magnetic field for effecting amplification by all of the crystals throughout a wide frequency band;

FIGURE 2 is a top plan view of the row of active crystals superimposed on the meander line, showing diagrammatically how the various crystals are cut at different angles to the optic axis thereof;

Figure 4:
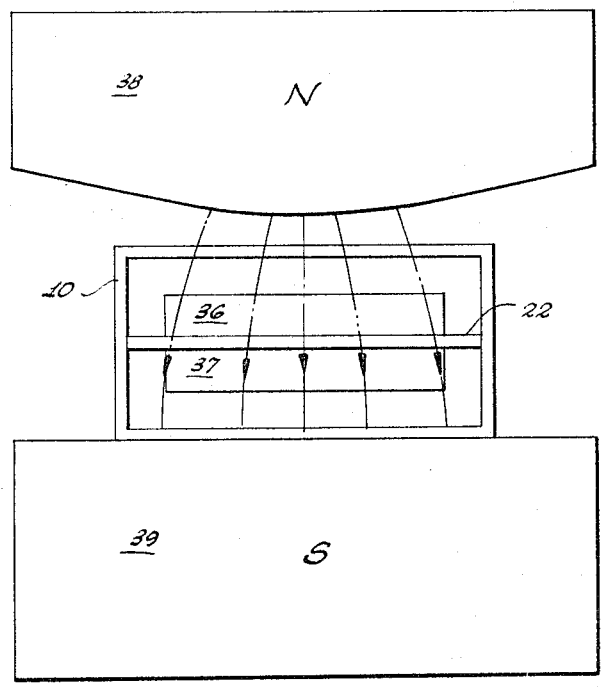
Figure 5:
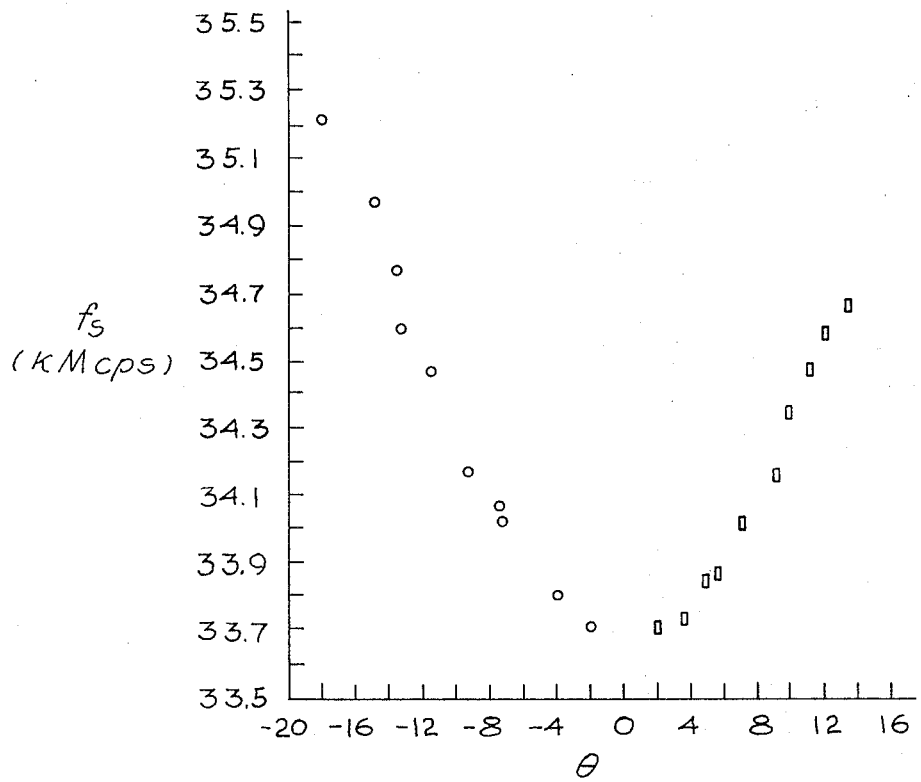

FIGURE 4 is an end view of a modification of my invention using a single crystal slab, wherein broadbanding is achieved by appropriately shaped magnetic fields to pass through the crystal at different angles along its width; and FIGURE 5 is a graph of maser signal frequency versus the angle between the magnetic field and the crystal axes and illustrates continuous tuning of the signal over a wide bandwidth.

Referring now to FIGURE 1 in the drawings, there is shown in phantom a waveguide 10 that is located between a pair of magnet poles 11, 12 that establish a uniform magnetic field along the length of the waveguide. An input signal to be amplified is applied through a waveguide connection 13 and associated coupling element 14 at one end of the waveguide 10. The amplified output is obtained from a like coupling element 15 and waveguide connection 16 located at the other end of the waveguide 10.

In accordance with my invention, two rows 20, 21 of crystals of maser material are placed side by side, extending as shown between the coupling elements 14, 15. The crystals in the two rows may be the same in size and number, and may be rectangular in form as shown. The rows 20, 21 of crystals are on either side of a so-called meander line element 22, which (see FIGURE 2 along with FIGURE 1) is a flat strip of metal of generally serpentine form and uniform cross-section, in which equal lengths are parallel to each other and of equal pitch. The spaces between certain parallel portions, e.g., those beyond the ends of the rows 20, 21, may be tapered to obtain desired impedance matches with output connectors. The crystals in the two rows 20, 21 are centered against the opposite surfaces of the meander line 22. As shown, the coupling elements 14, 15 are comprised of the ends of the meander line 22 extending through aligned slots in the side walls of the waveguide 10 and the waveguide connections 13, 16.

Thus arranged, the circuit operates as a traveling-wave maser in the presence of a suitable pump signal frequency. For this latter purpose, a single frequency pump source 23 is adapted to introduce a pump signal into the end of the waveguide 10 in which the input signal is launched. The introduction of the pump power into the waveguide is effected through a standard waveguide connection (not shown) from the source 23 to the waveguide 10.

Preferably, the crystals are cooled, e.g., as by means of liquid helium in which the structure is immersed, all as is well known in the art. Thus cooled, e.g., to 4° K., and supplied with the pump frequency, the crystals function in the desired manner, e.g., for three-level masers, that is to store energy (from the pump signal) and become emissive when stimulated by radiation at the desired signal frequency. The stimulated emission is a microwave signal that is an amplified version of the stimulated signal.

The structure described is a slow wave structure, that is to say, due to the meander line 22, which the propagated signal traverses, the propagated wave is slowed significantly. Since the rate of progression of the propagated wave along the axis of the waveguide 10 is slowed, i.e., has a so-called low group velocity, the wave is more effectively coupled to the crystal material and acts on it long enough to cause the stimulated emission that results in amplification. Stated differently, because of the circuitous path of structure 22 and the fact that the wave follows it, the wave will have a much slower effective velocity along the axis of the amplifier. As a result, a long interaction time is provided between the signal and crystal elements, thereby securing the desired signal gain.

In the circuit of FIGURE 1, only the crystals in one of the rows, e.g., the row 20, are active for amplifying the forward (injected) wave. The crystals in the other row 21 do not function as emissive elements, but are only absorptive. Also, they are selectively absorptive, in that they do not couple to the forward wave, but only to the backward, or reflected, wave. In this connection, the fact is that a perfect impedance match cannot be obtained between the waveguide output and the rest of the circuit. Therefore, there will be reflections back through the waveguide 10, which could give gain instability, non-uniform response, or oscillations. Due to the "lossy" materials of the crystals in the row 21, these reflected waves are absorbed rather than amplified, and gain instability therefrom is minimized.

The array of crystals as shown and described results in signals being amplified that extend over a band many times the bandwidth or line width of any of the crystals used. To achieve this beneficial result, I use crystals whose frequency response curves overlap, and provide a number of crystals sufficient to give a good response throughout the desired total bandwidth, and also a desired gain for all signals throughout that band.

One way to obtain the crystals is to cut them from a single crystal, but at different angles with respect to the optic axis. Referring to FIGURE 2, assume that one crystal 26 is cut parallel to the optic axis, and that the remaining crystals are cut at successively larger angles to the optic axis, as indicated by the arrows in FIGURE 2. With this arrangement, a broadband amplifier structure results. With a sufficient number of such crystals, and the proper crystal material suitably doped, the crystals may be cut so as to obtain a great total bandwidth, e.g., 2000 mc. Stated differently, the total bandwidth and the center frequency thereof depend upon the crystal material, the angles at which the crystals are cut, and the magnetic field employed. Furthermore, in embodiments of my invention of the above type, the strength of the external magnetic field 11 and the frequency of the pump source 23 are constant.

An indication of the different angles at which the crystals may be cut and the bandwidth obtainable by so doing may be had from the graph in FIG. 5 wherein the square-shaped points respectively relate to the cutting of the several crystals in one direction but at ever-increasing angles, such as is shown in FIG. 2, and the circular-shaped points respectively relate to the cutting of the crystals in the other direction but also at ever-increasing angles. In compiling the data for this graph, a pump frequency of 70.4 kmc. p.s. was used and $TiO_2$ (rutile) crystals doped with from 0.1 to 0.02 percent $Fe^{3+}$ were employed. The magnetic field was kept substantially constant at 3000 gauss. It will be noticed from the graph that a bandwidth of about 200° mc. was thereby obtained.

For some uses, variation from a flat response may be tolerated, as long as the gain is sufficiently large throughout the desired band. In this connection, I have found crystals with so-called hyperfine structures suitable to obtain large bandwidth with a minimum number of crystals. By using a crystal doped with an ion which has hyperfine structure because of nuclear magnetic or electric quadrupole moments, the signal crystal is characterized as one having extra amplification bands. With crystals of this type, they are cut so that all desired amplification bands are combined to provide the desired over-all bandwidth for the amplifier. A fewer number of such crystals is required than for crystals having no hyperfine structure.

Continuing further in the matter of crystals, it was mentioned earlier that titanium oxide ($TiO_2$) doped with from 0.1 to 0.02 percent $Fe^{3+}$ could be employed as the crystal material. It should be emphasized, however, that the percentage doping mentioned was merely representative and that the percentage doping is not a critical factor. Furthermore, it should be recognized that other maser materials as well as other doping substances may be used in combination as crystals with equally good effect. Thus, by way of example, titanium oxide crystals could also be doped with chromium ions ($Cr^{3+}$), $Cr^{3+}$ ions could also be used in emerald or beryl ($Be_3Al_2Si_6O_{18}$), and $Mn^{4+}$ ions could be used to dope $TiO_2$.

As an aid to understanding my invention, the following factors relating to three-level maser theory should be noted. Successful application of the basic principle— using a microwave pump signal to effect emission to an amplified version of a stimulating radiation frequency— was first carried out by using microwave cavities to couple the stimulating radiation to a narrow-band paramagnetic salt crystal.

In cavity masers, the microwave cavity structure produces tight coupling of the microwave energy to the spins of the paramagnetic material. As a result of the use of a cavity to achieve this tight coupling, the bandwidth is limited. The traveling wave maser, on the other hand, uses a microwave structure which has a bandwidth considerably greater than that of the paramagnetic resonance, and maser bandwidths approach the line width of the material used.

As mentioned, microwave amplification is obtained by stimulating radiation from active material in the propagating structure, and by coupling the microwave fields to the paramagnetic salt long enough by slowing the velocity of propagation of the microwave energy through the structure. The active material produces an equivalent negative resistance in the slow wave structure, and a propagating wave having an exponentially increasing amplitude is obtained.

If a slow-wave structure is simply filled with the active material, i.e., no absorbing material such as in the crystals of the row 21, the device will be reciprocal and having gain in both directions. It would therefore require excellent input and output matches and presumably external isolation to obtain unilateral gain.

A preferred way to obtain unidirectional traveling-wave amplifications is to use a slow-wave structure which has definite regions of circular polarization of the microwave magnetic field, e.g., as created by a helical coil (not shown), or the meander line of FIGURES 1 and 2, to be traversed by the stimulating signal. Crystals of maser material are located on the meander line that have circularly polarized signal frequency transitions. The paramagnetic maser crystals of a type proposed for use with this invention have such circularly polarized transitions. The placement of the crystals is such that they are coupled to the microwave structure only for one direction of wave propagation. Then the maser has high gain in one direction and little or no gain in the reverse direction, that is the gain is non-reciprocal.

Gain in one direction and loss in the opposite direction are necessary to insure amplifier stability. The non-reciprocal loss in the waveguide 10 is obtained in the same manner as the non-reciprocal gain, i.e., by excitation of the crystals in the row 21. For this purpose, the crystals in this row may be an absorptive ferromagnetic material or the same material as the paramagnetic maser material except more heavily doped so that the thermal equilibrium is not too disturbed by the microwave pump power and the material does not become active. Also, the individual crystals of the row 21 are arranged with the same bandwidths as those in the row 20, and in the same manner are cut at different angles to the optic axis.

The gain of a traveling-wave maser may be obtained directly from the complex magnetic permeability of the active maser materials. The permeability can be written $$\mu = \mu_0(1+X'-jX'') \qquad (1)$$

where $X'$ and $X''$ are the real and imaginary parts of the normalized magnetic permeability of the paramagnetic material. Both $X'$ and $X''$ are, in general, tensor quantities. The exact values of $X'$ and $X''$ are obtainable from quantum theory and by experimental measurements of actual maser inversion in the material. Values of $X''$ at paramagnetic resonance are on the order of $10^{-2}$ to $10^{-3}$ for operation at liquid helium temperatures. $X'$ will produce reactance in the microwave circuit, while $X''$ can produce gain or loss depending on its sign, i.e., whether the maser material is inverted or not.

In most cases, therefore the paramagnetic permeability is a small perturbation of the total magnetic permeability.

The voltage gain of a traveling-wave maser can then be written $$\frac{V(L)}{V(O)} = \exp\left[\frac{-X''}{1+\left(2\frac{f-f_0}{BW_{X/2}}\right)^2}\frac{F\pi fL}{Vg}\right] \quad (2)$$

where, a Lorentzian line shape being assumed, $f=$ the signal frequency,
$f_0=$ the paramagnetic resonance frequency.

$BW_{X''/2}=$ the frequency band for $X'' > \frac{X''_{max}}{2}$.

This is the maser material bandwidth or line width.

$F=$ the filling factor (defined below).
$L=$ the physical length of the slow-wave structure, and $v_g=$ the group velocity in the slow-rate structure.

The filling factor, F, is used to describe the ratio of field energy coupled to the paramagnetic spin system to the total magnetic field stored in the slow-wave structure. Accordingly, it is defined as follows:

$$F = \frac{\int V \text{ mat. } H^* \cdot (X''H)dV}{|X''|\int H^*, HdV} \quad (3)$$

where $V_{mat}=$ the volume of the maser material
$V_s=$ the structure volume and,
$X''=$ the tensor permeability It is important to use the tensor permeability for $X''$ in the equations in order to include the possibility for non-reciprocal coupling of the material to the structure.

A simplified expression for the midband gain can be obtained by defining a magnetic Q for the maser material $$Q_{mag} = \frac{1}{F \cdot |X''_{max}|} \quad (4)$$

If the structure length is measured in free space wavelengths, N, and a slowing factor, S, is defined as $$S = c/V_g \quad (5)$$

where $c=$ the velocity of light, then the midband gain in decibels is $$G_{db} = 27.3 \, SN/Q_{mag} \quad (6)$$

It is seen that $1/Q_{mag}$ is a figure-of-merit for the maser material. Thus, as a typical case for 6 kmc. with a $Q_{mag}$ of 200 and a structure length of 2 wavelengths (10 cm.) a slowing factor $S=110$ is required to give a gain of 30 db. Without the slow-wave structure, N would be 220, requiring a structure length of 11 meters. Thus at this frequency, a slow-wave structure is required to make the amplifier size small enough for practical refrigeration to the required low temperatures. At higher frequencies, such as 35 kmc., this problem is ameliorated by the short wavelength and the very high dielectric constant of crystal materials suitable for use at such frequencies.

For a single crystal, the traveling wave maser gives amplification over a good part of the bandwidth of the active maser material and thus, in many cases, its useful bandwidth is an order of magnitude greater than that obtainable from the single cavity maser. If the maser bandwidth is defined as the frequency over which the gain is within 3 db of the mid-band value, the bandwidth is then $$BW = BW_{X''/2}\sqrt{\frac{3}{G_{db}-3}} \quad (7)$$

In the limit of high gain, $$BW\sqrt{G_{db}} = \sqrt{3} \cdot BW_{X''/2} \quad (8)$$

Thus for the traveling wave maser, the product of bandwidth and the square root of the gain in decibels is a constant.

Cavity maser gain-bandwidth product for high gain is $$BW\sqrt{G} = 2f/Q_{mag} \quad (9)$$

when $BW \ll BW_{X''/2}$. It should be noted that in the case of the cavity maser, it is the square root of the power gain which appears in the bandwidth expression, while it is the square root of the power gain in decibels for the traveling wave maser. Thus, for a $Q_{mag}$ of 200 and a 6-kmc. signal frequency, there results a 6 mc. bandwidth at 20 db, and less than 2 mc. at 30 db gain. This rapid variation of bandwidth is due to the regeneration used in the cavity maser in order to effectively couple to the small material volume. It is seen that $Q_{mag}$ is a figure-of-merit for both the traveling wave maser and the cavity maser.

In the traveling wave maser, useful slow-wave structure bandwidth may be an order of magnitude or more greater than the maser material bandwidth. Therefore, the center frequency of the maser pass-band can be tuned electronically over a wide frequency range simply by changing the pump frequency and the d.c. magnetic field. Thus a traveling wave maser with a 20 mc. passband may be tuned over a 200 to 500 mc. (or more) frequency range at 6 kmc.

An important consideration in maser amplifiers is the sensitivity of the gain to a slight change in the material inversion as measured by $X''$. Defining the ratio of percentage change in gain to the percentage change in $X''$ as a measure of this gain sensitivity, $S_g$: The gain sensitivity factors for a cavity maser and a traveling-wave maser are, respectively:

$$CM: S_g \alpha \sqrt{G}$$

(because this is a regenerative amplifier), and $$TWM: S_g \alpha \log_e G$$

wherein there is weak dependence on G.

Ultimately, gain stability in a maser is obtained by stabilization of the material $X''$ through temperature regulation and regulation of the pump power. It is also advantageous to use sufficient pump power to saturate the pump transition and, hence, make $X''$ relatively insensitive to pump power. These techniques are applicable to both the cavity and the traveling-wave maser.

In further elaboration of the foregoing, and in order to provide a better understanding of why the crystals (in the row 22) cut at different angles from the optic axis function to amplify signals far removed from the center frequency, the masering activities within the material should be noted. In this connection, it will be noted that the structure heretofore described is equivalent to one in which a plurality of crystals are provided that are all cut at different angles with respect to the optic axis. The result is that, as the angle with respect to the optic axis is changed, the spacing of the energy levels within the different crystals is changed and accordingly, the signal frequency transitions are similarly changed.

It is known that maser crystal materials are anisotropic, which means that properties in different directions are different, i.e., the arrangements, spacing and numbers of atoms are different along lines in different directions through the crystal. Within a crystal are several so-called preferred axes, the principal one of which is the optic axis. Since the optic axis in effect determines a preferred direction through the crystal, it is used as a reference. It will be appreciated that the optic axis is determined by suitable techniques well known in the art, e.g., X-ray diffraction patterns.

As is well known, the chemical bond that holds the atoms of molecules together in a crystal have definite kinds of symmetries or angles, and the crystal has a definite shape depending upon such chemical bond. As a crystal is grown, the molecules become attached to each other with certain directions, angles and spacings. Depending upon the nature of the angles, different symmetries and different shapes result for the crystal faces.

Typically, a maser crystal is one formed of a host lattice formed of a regular array of atoms making up the molecules, but wherein a small percentage of some of the atoms is replaced, or "doped," with atoms of another material. For example, in a crystal in which the host lattice is titanium dioxide, a small fraction of the titanium may be replaced with iron, chromium or manganese. It is this "impurity" in the environment of the rest of the crystal that is excited. The kinds of frequencies exhibited by the impurity will be affected by the crystal it is in, because the atoms of the host lattice interact with those of the impurity and help to determine its resonances.

As previously mentioned, there must be at least three such resonances or energy levels. This also means that if there are more than three energy levels, then any three of those levels can be used. Because these materials have several energy levels, the selected crystals and crystal cuts in my invention are chosen so that each has a set of energy levels where the population can be inverted for the same pump frequency.

Further, the sets of energy levels selected determine the pump power required, because making transitions between certain levels could be easier or more difficult than for other sets for the same crystal. This also depends, of course, upon the magnetic field being used, and upon the frequencies desired.

The selection of the energy levels out of all those available, and the choices of the magnetic field and pump frequency, depend upon the total design specifications that it is necessary to meet. If the widest band is needed, that alone tends to restrict the choices of energy levels that may be used. If the lowest pump power is desired, a still different set of energy levels would have to be used.

It should also be noted that the separation between a given pair of energy levels is proportional to frequency, and the ease (i.e., high transition probability) with which affected atoms may store and give up energy determines the amount of pump power required. In this connection, it is preferable to utilize crystals in which the zero field splitting approximates the desired energy level spacing at which it is desired to have the system operate. In other words, it is desirable that most of the splitting of energy levels shall not be due to the magnetic field, but that a significant part of such splitting be due to the crystal itself. In this manner, the number of oersteds required for the external magnetic field will be small, and hence only a small magnet need be used for my amplifier. Also, because of a mixing of the states, the transition probabilities for the pumping transition will be greater, and the required pump power thus lower.

Regarding the size of an amplifier unit of my invention, I am able to take advantage of the high dielectric constant of the crystal material in order to minimize the size of the crystals needed, as well as their number, for a great bandwidth amplifier. For example, the wavelength of a signal of 35 kmc. in air is only eight millimeters. However, in a waveguide containing maser crystals such at $TiO_2$ in accordance with my invention, the dielectric constant of the crystals is such that the dimensions of each crystal are cut down by a factor of ten. Therefore, at 35 kmc. each crystal is less than a millimeter in length. In general, the wave-length in the crystal is reduced by a factor equal to the square root of the dielectric constant.

As will be apparent, for a very wide bandwidth amplifier built in accordance with my invention, each crystal is capable of effecting a gain of a radiated frequency over its limited bandwidth. Accordingly, for such small crystals, the over-all gain for signals in its limited bandwidth is markedly cut down over that which would obtain if the entire set of crystals was cut in the same manner.

To obtain gain without sacrificing any of the bandwidth, the length of the waveguide may be increased, and the number of crystals increased for each portion of the total band over which it is desired to effect amplifications. Alternatively, instead of making the waveguide longer, separate sections of waveguide, each containing a set of crystals designed to amplify the desired signal, may be connected together. In this way, successive stages of amplifications may be provided in a manner analogous to tandem connections of amplifiers in typical radio circuits.

As a further aid to understanding the use of crystals with hyperfine structure in my invention, an example of one type of such crystal—$TiO_2$ doped with $Mn^{4+}$ will be considered. The conventional spin Hamiltonian for a non-hyperfine crystal of $TiO_2$, e.g., one that is doped with $Fe^{3+}$ or $Cr^{3+}$, is:

$$H = g\beta HS \cos\theta + D[S^2_x - \tfrac{1}{3}S(S+1)] + E(S^2_x - S^2_y) \quad (10)$$

For this case, cutting crystals at varying angles to the optic axis results in a stagger-tuned design to give continuous, broadband amplification. In this connection, it will be seen that the first term in Equation 10 is dependent on the cosine of the angle between the D.-C. magnetic field and the spin.

$Mn^{4+}$ consists entirely of isotope 55 with nuclear spin equal to 5/2. It has a magnetic moment of +3.46 nuclear magnetons and a quadrupole moment of $$+0.4 \times 10^{-24} cm.^2$$

To account for the magnetic interaction between the nuclear magnetic moment and the paramagnetic electrons, a term must be added to the spin Hamiltonian given above, as follows:

$$H_n = A_x S_x I_x + A_y S_y I_y + A_z S_z I_z \quad (11)$$

where the $I$'s are the components of nuclear spin.

An electric quadrupole moment may also exist and give still more terms in the Hamiltonian above. These terms would then give rise to still more levels and transitions more closely spaced than for nuclear magnetic moments alone. In the maser magnetic field there would be also even more closely spaced levels due to Zeeman splitting of the quadrupole levels.

The effect of $H_n$ is to increase the number of states to $(2S+1)(2I+1)$, often resulting in an increase by an order of magnitude of the number of levels over the three required for ordinary maser action. Nuclear quadrupole effects would increase these further. The level splittings caused by $H_n$ range from $A$ to $(I+\tfrac{1}{2})A$. Since $A$ is typically of the order of a few hundred mc. and $I$ may be as great as 7/2, the band of frequencies covered may range from 100 to 1000 mc. Nuclear quadrupole bands lie in this range.

These considerations are applied to a stagger-tuned maser design using $Mn^{4+}$ in rutile and the above more complete Hamiltonian. Measurements at 7-mm. and 3-cm. wavelengths give the following values for the parameters for this case.

$$H = g_{ij}\beta H \cdot S + D[S_x^2 - \tfrac{1}{3}S(S+1)] + E(S_x^2 - S_y^2)$$
$$= A_z S_z I_z + A_y S_y I_y + A_x S_x I_x \quad (12)$$

$$D = 12.2 \text{ kmc.}$$

$$E/D = 0.3207, \text{ i.e. } E \sim 3.88 \text{ kmc.}$$

$$A_x \sim A_y \sim A_z \sim 216 \text{ mc.}$$

$$g_x = 1.995; \ g_y = 1.991; \ g_z = 1.990.$$

This gives a total initial splitting of about 27 kmc. This should be compared with that of $Cr^{3+}$ in rutile with $D = 0.55$ cm.$^{-1}$, $E = 0.27$ cm.$^{-1}$ and an initial splitting of about 1.45 cm.$^{-1}$ or about 43 kmc./sec.

The orientation of the D.-C. magnetic field, H, relative to the crystal axes is defined by polar angles $\theta$, $\phi$, the colatitude, $\theta$, is the angle between $H$ and the $Z=C$ (optic) axis, and $\phi$ is the azimuth angle.

Despite the smaller initial splitting there are a number of angles in which maser transitions at 34 kmc. are possible. For example $\theta=0$, or $\theta=90°$ when $\phi=90°$ gives rise to maser action at 34 kmc. at 5 kilogauss and a pumping frequency of about 55 kmc./sec. (i.e., both ions are equivalent). Another example is $\theta=0$, $\phi=0$, and pumping frequency at about 65 kmc./sec.

There are many other such possibilities.

The crystal containing $Mn^{4+}$ has the following important advantages:

(a) Nuclear spin $I=5/2$.
(b) Two types of transition:

$M=\pm 1$, $\pm 2$, $m=0$, dominant;
$M=\pm 1$, $\pm 2$, $m=\pm 1$, $\pm 2$, not quite so intense.

Looking at the dominant transition it is apparent that a single crystal cut in any given direction with respect to the optic axis will give rise to two sets of size frequencies spaced apart by about 200 mc./sec. (2 inequivalent ions). Each individual line has a line width of about 5–12 mc./sec. Slight misalignment of only a few degrees gives a broadband maser of at least 1000 mc./sec.; large misalignments cover great bandwidths. Indeed, only a small variation in angle is needed. For nearly all $\theta$ and $\phi$ there are additional fairly intense $m=\pm$ lines which fall nearly midway between the $m=0$ lines. Their intensity for a strictly axial field would behave like $DA/(bH)^4 \cos^2\theta \sin^2\phi$, and since $DA/(gH)^4$ is not a small number the so-called "forbidden" transitions have reasonably large intensities. Even at angles $\theta=0$, or $\theta=90°$ where the above term is zero, the "forbidden" transitions will not be of zero intensity because of terms like $EA/(g\beta H)^4$ which have a different angular dependence. Hence the interval of 1000 mc. or more is filled with many lines; nuclear quadrupole lines for the proper ion could increase the number still further.

Of course the number of paramagnetic ions will have to be increased a little because the intensity is now spread over the many hyperfine lines. However, this should not be too difficult or critical.

An important aspect is of course the line width and relaxation. First of all, the line width is narrower than in non-hyperfine structures, e.g., chromium in ruby. For some orientations the line width is as narrow as 2–3 gauss and for nearly all orientations less than 10 gauss (hence the Q of the line is larger than that of the cavity). It appears that the spin-lattice relaxation time is as long if not longer than for $Cr^{3+}$. Also, the hyperfine structure spread makes possible a very effective cross-relaxation.

Figure 3:
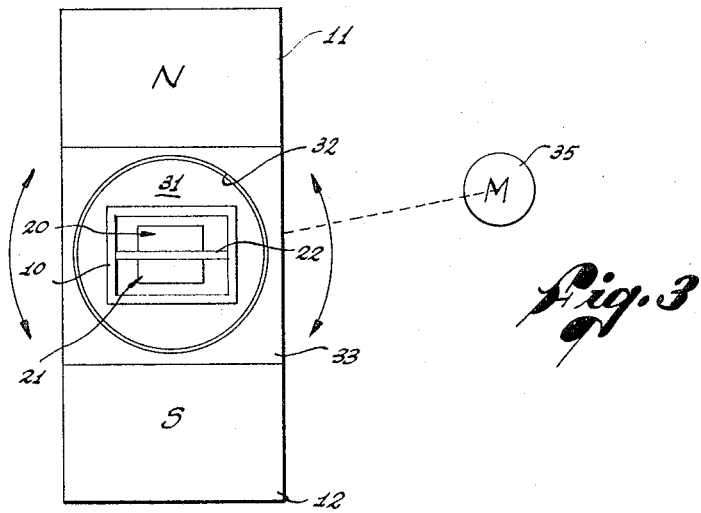
FIGURE 3 is an end view of a tunable broadband maser amplifier structure of my invention, showing the magnet rotatable about the longitudinal axis of the waveguide.

The maser amplifier of FIGURE 1 using stagger-tuned crystals in accordance with my invention provides the desired extremely broadband operation with a fixed magnetic field of uniform strength, and a single frequency pump source. FIGURE 3 illustrates another feature of my invention, by which such a system as that of FIGURE 1 is adapted to be tuned. For this purpose, the magnet poles 11, 12 are rotated about the longitudinal axis of the waveguide 10.

To effect rotation of the poles 11, 12 in the desired manner, the waveguide 10 is encased in a rod 31, which in turn slidably fits in the bore 32 of the block 33, both the rod 31 and block 33 being of non-magnetic material, e.g., silver.

The poles 11, 12 are suitably secured to block 33. Therefore, as will readily be seen, the entire assembly of the magnets 11, 12 and the block 33 are rotatable on the bar 31. Thus, rotation of this assembly about the rod 31 effectively changes the direction on the lines of force through the rows 20, 21 of crystals. In this manner, the position of the frequency band for each crystal, and hence the position of the total frequency band of the amplifier, is changed from that in which the lines of force are all normal to the surfaces of the rows of crystals. Thus, the center frequency of the total band is a function of the angle at which the poles 11, 12 are displaced about the longitudinal axis of the waveguide 10. Selected control of this angular position may be effected manually, or automatically, as through a motor 35. Alternatively, of course, the motor 35 may be adapted to rotate the rod 31 within the assembly comprising the poles 11, 12 and the block 33.

FIGURE 4 illustrates an embodiment of my invention in which, instead of a row of a plurality of crystals, a single large crystal is employed to obtain broadband operation. Referring to FIGURE 3, active and absorptive crystals 36, 37 are provided which have longitudinal parallel zones in which masering action takes place in respective small bands in the presence of lines of force that pass through them at different angles from the optic axis. In order to establish and maintain lines of force that pass through the crystals 36, 37 at angles sufficient to create a plurality of overlapping bands to provide a desired total bandwidth, I shape the magnet poles 38, 39 in an appropriate manner. FIGURE 4 shows, by way of example, one of the magnetic poles 38 being shaped so that lines of force adjacent its face converge toward its center. The other magnetic pole 39 is shown with its entire face parallel to the crystals 36, 37 so that magnetic lines of force entering its face are non-convergent. Alternatively, the face of the magnetic pole 39 could be shaped so that the magnetic lines of force diverge from the center portion thereof. With such shaping of the magnets, and hence selective directing of the lines of force, the active crystal 37 is caused to absorb energy over a desired range of frequencies, e.g., of the same order of magnitude as in the maser amplifier of FIGURE 1.

It should be noted that my invention is not limited to use for microwave frequencies that require the use of particular types of couplings for the input and output. Waveguide couplings are usually used for higher microwave frequencies, and coaxial input and output connections are usually used for lower microwave frequencies.

Further, any suitable means may be employed for input and output couplings elements, e.g., probe and loop couplings may be used.

My invention also embraces the use of active and attenuating crystals that are made of different materials in which doping is different. Hence, although both the active and attenuating crystals are stagger-tuned, the size and number of these two types of crystals may be different in a given amplifier.

From the foregoing, it will be apparent that while I have illustrated and described particular embodiments of my invention, various modifications can be made therein without departing from the spirit and scope of my invention. Accordingly, I do not intend that my invention shall be limited, except as by the appended claims.

Having thus described the invention, what is claimed is:

1. A maser amplifier comprising: a length of microwave broadband wave slowing structure having regions of right- and left-handed circular polarization; input and output connections at the ends of said wave slowing structure; maser crystal structures in the different regions of said wave slowing structure, one crystal structure in one region having different portions cut at different angles to the optic axis thereof and adapted to be conditioned to store energy in different energy levels and which are active to release the stored energy as electromagnetic radiations when simulated by a signal of the desired frequency applied to said input connection, the frequency bands over which the energy is released together forming a broad frequency band, the other crystal structure being adapted in the other region to absorb electromagnetic radiations reflected from the output to the input ends of said waveguide, said other crystal structure have different portions cut at different angles to the optic axis thereof so that they absorb radiations over frequency bands corresponding to those over which the respective active portions release energy; means for injecting a pump signal of predetermined frequency into the input end of said waveguide; and means for directing a magnetic field through said waveguide and the crystal structures to cause the corresponding active and absorptive portions to release and absorb energy in their corresponding frequency bands when a signal in their bands is applied to said input connection.

2. A maser amplifier as stated in claim 1 including means for varying the angle between said magnetic field and said crystal structures to permit tuning of the amplifier over a wide frequency range.

References Cited by the Examiner

FOREIGN PATENTS 1,117,664 11/1961 Germany.
1,117,665 11/1961 Germany.

OTHER REFERENCES

Okwit et al., "Proceedings of the IRE," June 1962 (article submitted in November 1961), pp. 1470–1483 (only page 1479 relied on).

ROY LAKE, *Primary Examiner.*

D. HOSTETTER, *Assistant Examiner.*